3,444,374
NEUTRON FLUX MEASURING DEVICE COMPRISING A DETECTOR SURROUNDED BY A DOUBLE-WALLED JACKET CONTAINING NEUTRON ABSORBING FLUID
Takehiko Kinoshita, Tokai-mura, Ibaragi-ken, and Tatsuo Yatsurugi, Mito-shi, Ibaragi-ken, Japan, assignors to Nihon Genshiryoku Kenkyujo, Tokyo, Japan, a corporation of Japan
Continuation of application Ser. No. 542,707, Mar. 30, 1966. This application May 29, 1967, Ser. No. 642,240
Int. Cl. G01t 3/00
U.S. Cl. 250—83.1    2 Claims

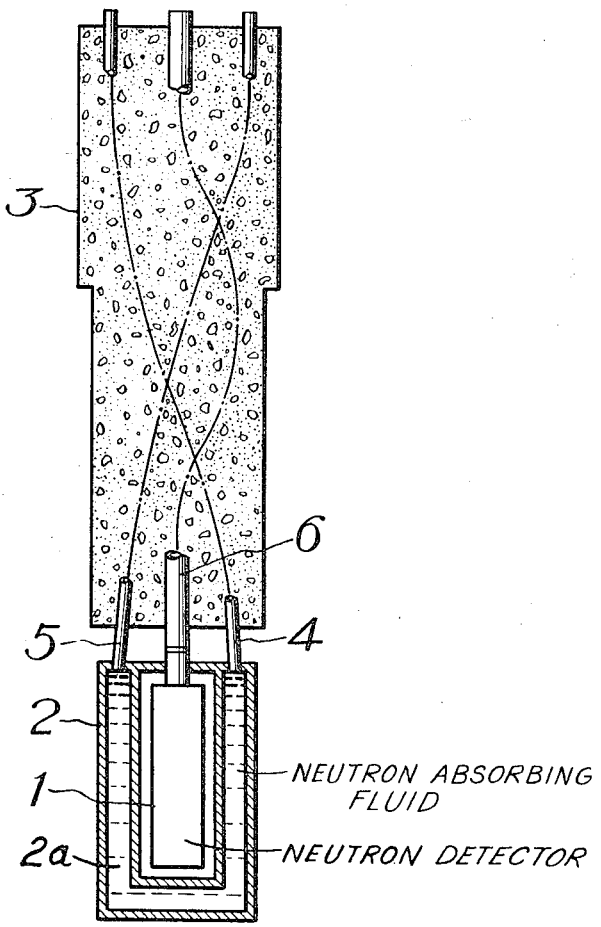

ABSTRACT OF THE DISCLOSURE

A neutron flux measuring apparatus comprising a gamma-compensated, parallel circular plate, boron trifluoride filled, ionization chamber type neutron detector. The detector is surrounded by a fluid-tight, double-walled jacket into which a neutron absorbing fluid is introduced. The fluid may be in liquid or gaseous form and the neutron absorbing substance in the fluid may be of varying concentrations.

---

This application is a continuation of Ser. No. 542,707, filed Mar. 30, 1966, which was a continuation-in-part of Ser. No. 288,742, filed June 18, 1963; both applications are now abandoned.

The present invention relates to a device for measuring neutron flux produced by a neutron generator in a nuclear reactor or similar apparatus. A neutron detector head of conventional type such as gamma-compensated ionization chamber, parallel circular plate type ionization chamber, $BF_3$ counter used for measuring and controlling the flux in a nuclear reactor is non-linear in its response characteristics. Also, it is difficult to locate the conventional detector head in a neutron generating device within the desired neutron flux density range.

In the conventional methods, the measurement of the desired neutron flux usually involves the changing of an area shielded by a neutron shielding plate or by shifting the position of a neutron detector head or neutron reflector to fix the position thereof by trial and error.

According to the present invention, the device for measuring neutron flux utilizes the variation of such factors as concentration or pressure and chemical composition of a fluid neutron absorber in a surrounding jacket for changing the neutron cross-section thereof; thereby giving the desired density to the neutron flux sensed by a neutron detector head after said neutron detector is placed in a neutron generator, the variable-shielding jacket with the absorber fluid being positioned to shield a neutron detector from outside neutrons and having the structure of a jacket filled with the neutron absorber fluid.

The accompanying drawing illustrates a preferred embodiment of the invention.

In the drawing, 1 designates a neutron detector head operative within a predetermined range of flux densities, 2 a jacket for containing the neutron absorber fluid, 2a the absorber fluid which has predetermined constant absorption characteristics, 3 a radiation shielding plug, 4 a supply pipe for the absorber fluid, 5 a discharge pipe for said fluid and 6 a conduit including electrical connections for the neutron detector head 1.

The present device is placed in a position where the neutron flux in the neutron generating apparatus is a little higher than desired without the absorber fluid, and then connected to measuring devices, such as amplifier, indicator, recorder, etc. Thus, the neutron flux is measured during operation of the neutron generating device. During operation, there are prepared different liquids or gases with varying boron concentration, and a suitable fluid 2a is fed into the jacket 2 by a pump (not shown) through a feed pipe 4. The neutron flux is again measured and the boron content of the absorber fluid is adjusted, so that the desired neutron flux density is sensed by the detector head. When the neutron flux attains the desired density value within the operational range of the detector head 1, the feed pipe 4 and discharge pipe 5 are shut off so that the boron content of the neutron absorbing fluid in the jacket 2 may not be changed and thus remains constant during measurements, the fluid 2a remaining fixedly positioned in the jacket 2.

The above adjustment may also be made, when a gas is employed as the neutron absorber, by changing the pressure thereof.

Fluids containing atoms other than boron and having different neutron absorbing cross-sections may also be used as a neutron absorber.

As described above, the present invention does not require any shifting of the position of the neutron detector head or the changing of the effective area of a shielding plate as in conventional methods.

While we have shown and described what we believe to be the best embodiments of our invention, it will be apparent to those skilled in the art that various changes and modifications may be made therein without departing from the spirit and scope of the invention as defined in the appended claims.

What is claimed is:
1. A method of measuring the flux density of neutrons by the utilization of a neutron detector which is operative within a predetermined range of flux densities, said method comprising the steps of: at least partially surrounding said detector with a fluid-tight double-walled jacket; positioning said detector and said jacket in a region wherein said flux density is to be measured with said jacket interposed in the path of the neutrons arriving at said detector, the flux density in said region being greater than the optimum flux density for operation of said detector; preparing a neutron absorbing fluid; adjusting the neutron absorptive characteristic of said fluid to a predetermined value for reducing the flux density of said neutrons arriving at said detector by a desired amount; and introducing said fluid between the walls of said jacket.
2. The method according to claim 1, comprising the further step of fixedly confining said fluid between said walls.

References Cited

UNITED STATES PATENTS

| 2,944,150 | 7/1960 | Replogle et al. | 250—83.1 |
| 3,009,062 | 11/1961 | Brooksbank et al. | 250—83.1 |
| 3,028,497 | 4/1962 | Tengsater | 250—108 X |

ARCHIE R. BORCHELT, *Primary Examiner.*

U.S. Cl. X.R.
250—108